United States Patent
Onodera et al.

(10) Patent No.: US 11,045,982 B2
(45) Date of Patent: *Jun. 29, 2021

(54) BLOW-MOLDED FOAM

(71) Applicant: KYORAKU CO., LTD., Kyoto (JP)

(72) Inventors: Masaaki Onodera, Yamato (JP); Takehiko Sumi, Yamato (JP); Teruo Tamada, Yamato (JP); Yu Igarashi, Yamato (JP); Yoshinori Ohno, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/457,846

(22) Filed: Jun. 28, 2019

(65) Prior Publication Data
US 2019/0322009 A1 Oct. 24, 2019

Related U.S. Application Data

(63) Continuation of application No. 15/156,297, filed on May 16, 2016, now Pat. No. 10,369,727, which is a
(Continued)

(30) Foreign Application Priority Data

Mar. 31, 2008 (JP) .................................. 2008-093894

(51) Int. Cl.
*F16L 9/14* (2006.01)
*B29C 44/02* (2006.01)
(Continued)

(52) U.S. Cl.
CPC .......... *B29C 44/02* (2013.01); *B29C 44/3442* (2013.01); *B29C 44/3469* (2013.01);
(Continued)

(58) Field of Classification Search
CPC ... B60H 1/00564; B29C 44/352; B29C 44/02; Y10T 428/1376
(Continued)

(56) References Cited

U.S. PATENT DOCUMENTS 4,397,797 A 8/1983 Nojiri et al.
4,577,998 A 3/1986 Dorrn
(Continued)

FOREIGN PATENT DOCUMENTS

JP 63-309434 A 12/1988
JP 2001-527106 A 12/2001
(Continued)

OTHER PUBLICATIONS

International Search Report in PCT/JP2009/001519, dated Jul. 7, 2009. 2pp.

*Primary Examiner* — James F Hook
(74) *Attorney, Agent, or Firm* — Maier & Maier, PLLC

(57) ABSTRACT

An object of the invention is to provide a blow-molded foam which has homogeneous foamed cells in size, is light in weight, and is excellent in surface smoothness, and a process for producing the same. The invention is directed to a blow-molded foam 1 having a wall portion formed in such a manner that a thermoplastic resin containing a foaming agent mixed therewith is subjected to blow molding. Herein, the wall portion has a closed cell structure in which a plurality of foamed cells are contained. The wall portion has an expansion ratio of not less than 2.0 times. The wall portion has an outer face having a center-line average surface roughness Ra of less than 9.0 μm. The foamed cell has a cell diameter having a standard deviation of less than 40 μm in a thickness direction of the wall portion.

19 Claims, 7 Drawing Sheets

Related U.S. Application Data continuation of application No. 13/950,248, filed on Jul. 24, 2013, now Pat. No. 9,340,091, which is a continuation of application No. 12/935,520, filed as application No. PCT/JP2009/001519 on Mar. 31, 2009, now Pat. No. 8,517,059.

(51) Int. Cl.

| | |
|---|---|
| *B29C 44/34* | (2006.01) |
| *B29C 49/00* | (2006.01) |
| *B29C 49/04* | (2006.01) |
| *B60H 1/00* | (2006.01) |
| B29C 49/48 | (2006.01) |
| B29K 23/00 | (2006.01) |
| B29K 105/04 | (2006.01) |
| B29L 23/00 | (2006.01) |
| B29L 31/30 | (2006.01) |
| B29L 22/00 | (2006.01) |

(52) U.S. Cl.
CPC ........ *B29C 44/352* (2013.01); *B29C 49/0005* (2013.01); *B29C 49/0047* (2013.01); *B29C 49/04* (2013.01); *B60H 1/00564* (2013.01); B29C 49/4802 (2013.01); B29K 2023/00 (2013.01); B29K 2023/10 (2013.01); B29K 2023/12 (2013.01); B29K 2105/046 (2013.01); B29L 2022/00 (2013.01); B29L 2023/004 (2013.01); B29L 2031/3005 (2013.01); Y10T 428/1376 (2015.01); Y10T 428/24355 (2015.01)

(58) Field of Classification Search
USPC ......................................... 138/149; 428/36.5
See application file for complete search history.

(56) References Cited

U.S. PATENT DOCUMENTS

| | | |
|---|---|---|
| 4,874,649 A | 10/1989 | Daubenbuchel et al. |
| 4,931,327 A | 6/1990 | Liu et al. |
| 5,830,393 A | 11/1998 | Nishikawa et al. |
| 5,930,570 A | 7/1999 | Saito et al. |
| 6,376,059 B1 | 4/2002 | Anderson et al. |
| 6,432,525 B1 | 8/2002 | Gokuraku et al. |
| 6,706,223 B1 | 3/2004 | Anderson et al. |
| 6,749,794 B2 | 6/2004 | Spengler |
| 6,875,484 B1 | 4/2005 | Kogure et al. |
| 7,169,338 B2 | 1/2007 | Imanari et al. |
| 7,332,215 B2 | 2/2008 | Tokura et al. |
| 8,043,695 B2 | 10/2011 | Ballard et al. |
| 8,397,932 B2 | 3/2013 | Ichikawa et al. |
| 8,517,059 B2 | 8/2013 | Onodera et al. |
| 8,714,401 B2 | 5/2014 | Ichikawa et al. |
| 9,340,091 B2 * | 5/2016 | Onodera ................ B29C 49/04 |
| 10,369,727 B2 * | 8/2019 | Onodera .............. B29C 44/352 |
| 10,434,691 B2 * | 10/2019 | Onodera ............ B60H 1/00564 |
| 2002/0172739 A1 | 11/2002 | Anderson et al. |
| 2003/0051764 A1 | 3/2003 | Jungers |
| 2004/0074554 A1 | 4/2004 | Starita |
| 2007/0006986 A1 | 1/2007 | Derleth et al. |
| 2008/0308674 A1 | 12/2008 | Frantz et al. |
| 2009/0026198 A1 | 1/2009 | Ichikawa et al. |
| 2011/0073211 A1 | 3/2011 | Onodera et al. |
| 2011/0104414 A1 | 5/2011 | Onodera et al. |
| 2013/0149480 A1 | 6/2013 | Ichikawa et al. |
| 2013/0164474 A1 | 6/2013 | Igarashi et al. |
| 2014/0353273 A1 | 12/2014 | Koiso et al. |
| 2015/0044406 A1 | 2/2015 | Akuzawa et al. |
| 2015/0258718 A1 | 9/2015 | Onodera et al. |

FOREIGN PATENT DOCUMENTS

| | | |
|---|---|---|
| JP | 2002-192601 A | 7/2002 |
| JP | 2003-236918 A | 8/2003 |
| JP | 2004-116959 A | 4/2004 |
| JP | 2005-241157 A | 9/2005 |
| JP | 3745960 B2 | 2/2006 |
| JP | 2006-181957 A | 7/2006 |

* cited by examiner

35

BLOW-MOLDED FOAM

CROSS REFERENCE TO RELATED APPLICATIONS

The present application is a continuation of U.S. patent application Ser. No. 15/156,297, filed May 16, 2016 which is a continuation of U.S. patent application Ser. No. 13/950, 248, filed Jul. 24, 2013, which is a continuation of U.S. patent application Ser. No. 12/935,520, filed Nov. 10, 2010, which is a national phase of PCT/JP2009/001519 filed Mar. 31, 2009, and claims priority from Japanese Application Number 2008-093894 filed Mar. 31, 2008. The disclosures of all of the above-listed prior-filed applications are hereby incorporated by reference herein in their entirety.

TECHNICAL FIELD

The present invention relates to a blow-molded foam and a process for producing the same.

BACKGROUND ART

A foam blow-molding process is carried out by extruding a thermoplastic resin containing a foaming agent added thereto into an atmosphere as a parison and inserting the parison between split mold blocks (e.g., refer to Patent Document 1).

As a blow-molded foam product obtained by such a process, there has been known one that principally contains a polypropylene-based resin having predetermined physical properties (e.g., refer to Patent Document 2).

In such a blow-molded foam product, however, when being released to the atmosphere, foamed cells in the parison are abruptly expanded to make cells larger. Occasionally, there is a possibility that the cells are ruptured.

In order to overcome this disadvantage, there has been examined a process for making foamed cells finer in diameter while maintaining a high expansion ratio.

For example, there has been mentioned a foam duct molded by foam blow-molding in which a supercritical fluid is added as a foaming agent (e.g., refer to Patent Document 3).
Patent Document 1: JP 63-309434 A
Patent Document 2: Japanese Patent No. 3745960
Patent Document 3: JP 2005-241157 A

DISCLOSURE OF THE INVENTION

Problems to be Solved by the Invention

As described in Patent Document 3, in the foam duct having the fine foamed cells, the diameters of the respective foamed cells are made smaller, but are different in size from one another. Consequently, the resulting foam duct fails to provide satisfactory smoothness on a surface thereof.

The present invention has been devised in view of the circumstances described above, and an object thereof is to provide a blow-molded foam which has homogeneous foamed cells in size, is light in weight, and is excellent in surface smoothness, and a process for producing the same.

Solutions to the Problems

The present inventors have eagerly conducted studies for solving the problems described above and, as a result, have found out that the following configurations are allowed to solve the problems. Thus, the present inventors have completed the present invention.

That is, the present invention relates to (1) a blow-molded foam having a wall portion formed in such a manner that a thermoplastic resin containing a foaming agent mixed therewith is subjected to blow molding, wherein the wall portion has a closed cell structure in which a plurality of foamed cells are contained, the wall portion has an expansion ratio of not less than 2.0 times, the wall portion has an outer face having a center-line average surface roughness Ra of less than 9.0 µm, and the foamed cell has a cell diameter having a standard deviation of less than 40 µm in a thickness direction of the wall portion.

The present invention also relates to (2) a blow-molded foam according to the configuration (1), wherein the thermoplastic resin is a polyolefin-based resin.

The present invention also relates to (3) a blow-molded foam according to the configuration (2), wherein the polyolefin-based resin is a propylene homopolymer having a long-chain branched structure.

The present invention also relates to (4) a blow-molded foam according to any one of the configurations (1) to (3), wherein an average cell diameter of the foamed cell in the thickness direction of the wall portion is less than 300 µm.

The present invention also relates to (5) a blow-molded foam according to any one of the configurations (1) to (3), wherein an average cell diameter of the foamed cell in the thickness direction of the wall portion is less than 100 µm, and the standard deviation of the cell diameter of the foamed cell in the thickness direction of the wall portion is less than 30 µm.

The present invention also relates to (6) a blow-molded foam according to any one of the configurations (1) to (5), which is a climate control duct for vehicles.

The present invention also relates to (7) a process for producing the blow-molded foam according to any one of the configurations (1) to (6), including: a mixing step of adding a thermoplastic resin to a foaming agent and mixing the thermoplastic resin with the foaming agent in an extruder to prepare a resin mixture; a retaining step of retaining the resin mixture at a cylinder-shaped space defined between a mandrel and a die outer cylinder; an extruding step of extruding a parison from a die slit by use of a ring-shaped piston; and a molding step of subjecting the parison to blow molding by clamping split mold blocks with the parison inserted therebetween and blowing air on the parison.

The present invention also relates to (8) a process according to the configuration (7), wherein the thermoplastic resin is a polyolefin-based resin, and the foaming agent is in a supercritical state.

The present invention also relates to (9) a process according to the configuration (7) or (8), wherein in the extruding step, the parison is extruded at an extrusion rate of not less than 700 kg/hr.

Effects of the Invention

In the blow-molded foam according to the present invention, the wall portion has the closed cell structure in which the plurality of foamed cells are contained and also has the expansion ratio set within a predetermined range. Thus, it is possible to reduce the weight of the blow-molded foam. Moreover, the standard deviation of the cell diameter of the foamed cell in the thickness direction of the wall portion is set within a predetermined range. Thus, it is possible to make the foamed cells homogeneous in size. Further, the center-line average surface roughness Ra of the outer face of the wall portion is set within a predetermined range. Thus, it is possible to achieve high surface smoothness.

Therefore, for example, in a case where the blow-molded foam is used as a climate control duct for vehicles, it is possible to reduce frictional resistance against flowing air and to improve ventilation efficiency. Thus, it is possible to reduce pressure loss of climate control air and to reduce a possibility that condensed moisture adheres to an outside of a wall face of the duct.

Moreover, in a case where the blow-molded foam is used as a skinned panel, it is possible to improve a deposition strength of a reinforcing rib to be formed on an inside of a wall face of the panel and a deposition strength of a skin to be bonded to an outside of the wall face of the panel. Further, it is also possible to provide high rigidity and excellent appearance.

In the case where the thermoplastic resin is a polyolefin-based resin, the blow-molded foam is improved in impact resistance because this material is excellent in flexibility. Preferably, the polyolefin-based resin is a propylene homopolymer having a long-chain branched structure. In this case, the resin is foamed with ease, so that the resulting foamed cells are made homogeneous.

In the case where the average cell diameter of the foamed cell in the thickness direction of the wall portion is less than 300 µm, the blow-molded foam is further improved in surface smoothness. More preferably, the average cell diameter is less than 100 µm.

In the process for producing a blow-molded foam according to the present invention, the resin mixture is retained at the predetermined position. Thus, it is possible to homogenize foamed cells in size. Moreover, the resin mixture is extruded at the predetermined extrusion rate by use of the ring-shaped piston. Thus, it is possible to subject the resin mixture to blow molding with the size of the foamed cell maintained.

Accordingly, the process for producing a blow-molded foam allows production of a blow-molded foam which has homogeneous foamed cells in size, is light in weight and is excellent in surface smoothness. Moreover, the foamed cells are made finer by use of a foaming agent which is a supercritical fluid.

In the process for producing a blow-molded foam, when the extrusion rate of the parison is not less than 700 kg/hr in the extruding step, the foamed cells are further homogenized in size.

BEST MODE FOR CARRYING OUT THE INVENTION

Figure 1:
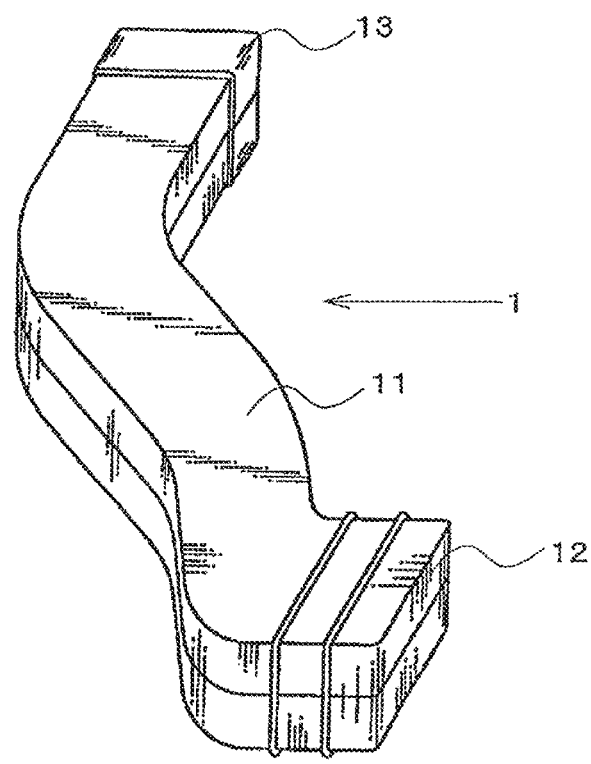
FIG. 1 is a perspective view that illustrates a blow-molded foam according to a first embodiment of the present invention.

Preferred embodiments of the present invention will be described in detail below with reference to the attached drawings if necessary. In the drawings, identical reference signs designate identical components, and duplicate description is not given here. Moreover, positional relations such as a up-to-down relation and a right-to-left relation are determined based on the positional relations illustrated in the drawings, unless otherwise specified. In the respective drawings, further, dimensional ratios are not intended to be limited to ratios illustrated in the drawings.

First Embodiment

The following description is given about a case where a blow-molded foam according to a first embodiment of the present invention is used as a climate control duct.

FIG. 1 is a perspective view that illustrates the blow-molded foam according to the first embodiment of the present invention.

As illustrated in FIG. 1, the blow-molded foam 1 (hereinafter, also referred to as "climate control duct") according to this embodiment has a wall portion formed in such a manner that a thermoplastic resin containing a foaming agent mixed therewith is subjected to blow molding. The climate control duct 1 includes a main body 11, an air inlet 13 formed at a first end of the main body 11, and an air outlet 12 formed at a second end of the main body 11. Details of the blow molding will be described later. Moreover, the air outlet 12 is opened by cutting a portion which is closed by post-processing after the blow molding.

The climate control duct 1 has a hollow structure in which a cross section is has a rectangular shape. That is, the cross section of the main body 11 has a hollow structure surrounded with the wall portion.

Therefore, the climate control duct 1 is allowed to guide climate control air to the hollow portion.

In the climate control duct 1, the main body 11 is curved smoothly, and has such a function that the climate control air that has been allowed to flow into the air inlet 13 is made to flow out from the air outlet 12 that is directed in an "L"-shaped direction relative to a direction in which the climate control air has been allowed to flow in.

For example, in a climate control duct for vehicles, the air inlet 13 is coupled to an air conditioner unit, and climate control air supplied from the air conditioner unit is allowed to flow through the hollow portion, and can be discharged from the air outlet 12 that is disposed at a desired position.

The wall portion has a closed cell structure in which a plurality of foamed cells are contained. Herein, the closed cell structure refers to a structure having a plurality of foamed cells, and means a structure in which at least a closed cell ratio is not less than 70%.

In the climate control duct 1, the wall portion has the closed cell structure, so that the climate control duct 1 is excellent in surface smoothness and outer appearance. In particular, the climate control duct is advantageous in improving ventilation efficiency and in reducing generation of condensed moisture.

The foamed cells are preferably designed to have an average cell diameter of less than 300 μm in a thickness direction of the wall portion, more preferably, less than 100 μm. Herein, the average cell diameter refers to an average value of the maximum diameters of the respective cells in the thickness direction of the wall portion.

When the average cell diameter is not less than 300 μm, the surface roughness becomes large in comparison with a case where the average cell diameter falls within the range described above, and tends to cause degradation in surface smoothness.

In the climate control duct 1, the average wall thickness of the wall portion is preferably not more than 3.5 mm.

When the average wall thickness exceeds 3.5 mm, an air passage is narrowed in comparison with the average wall thickness that falls within the range described above, and tends to cause degradation in ventilation efficiency.

In the climate control duct 1, the outer face of the wall portion preferably has a center-line average surface roughness Ra of less than 9.0 μm, more preferably, less than 6.0 μm. Herein, the center-line average surface roughness Ra is a value measured in conformity with JIS B0601.

When the center-line average surface roughness is set to less than 9.0 μm, it is possible to provide excellent surface smoothness and outer appearance. In particular, the resulting climate control duct is advantageous in improving ventilation efficiency and in reducing generation of condensed moisture.

In the climate control duct 1, the standard deviation of cell diameter of the foamed cell in the thickness direction of the wall portion is less than 40 μm. Herein, the standard deviation of the cell diameter indicates the evenness of the foamed cell diameters, and the smaller the standard deviation, the more even foamed cell diameter is provided.

When the standard deviation of the cell diameter exceeds 40 μm, deviations in the foamed cell diameters become greater. Consequently, the surface smoothness and outer appearance tend to become deteriorated. The standard deviation of the cell diameter is more preferably less than 30 μm.

In the climate control duct 1, the expansion ratio of the wall portion is not less than 2.0 times. Herein, the expansion ratio is a value obtained by dividing the density of a thermoplastic resin used upon the foam blow-molding by the apparent density of the wall face of the blow-molded foam.

When the expansion ratio is less than 2.0 times, it is not possible to obtain a lightweight blow-molded foam.

The blow-molded foam 1 (climate control duct) according to this embodiment is obtained in such a manner that a thermoplastic resin containing a foaming agent mixed therewith is subjected to blow molding.

Examples of such a thermoplastic resin include polyolefin-based resins such as a polyethylene resin and a polypropylene resin. Since the polyolefin-based resin is excellent in flexibility, it is possible to improve impact resistance of the blow-molded foam.

Among these, the thermoplastic resin preferably has a propylene unit, and specific examples thereof include a propylene homopolymer, an ethylene-propylene block copolymer, an ethylene-propylene random copolymer, and the like.

Moreover, among these, the propylene homopolymer having a long-chain branched structure is more preferably used. In this case, the resin is foamed with ease since its melt tension becomes higher, and foamed cells are further homogenized.

The propylene homopolymer having a long-chain branched structure is preferably prepared as a propylene homopolymer having a weight-average branching index of not more than 0.9. Moreover, the weight-average branching index g' is represented by V1/V2, and V1 represents a limiting viscosity number of a branched polyolefin, while V2 represents a limiting viscosity number of a linear polyolefin having the same weight-average molecular weight as that of the branched polyolefin.

As the thermoplastic resin, a polypropylene resin having a melt tension in a range from 30 to 350 mN at 230° C. is preferably used. Herein, the melt tension refers to a fused-state tension. When the melt tension falls within the range, the foaming polypropylene-based resin exhibits a strain hardening characteristic, and is allowed to provide a high expansion ratio.

The thermoplastic resin preferably has a melt flow rate (MFR) in a range from 1 to 10 at 230° C. Herein, the MFR is a value measured in conformity with JIS K-7210.

When the MFR is less than 1, it tends to become difficult to raise the extrusion rate in comparison with the case where the MFR falls within the range. When the MFR exceeds 10, it tends to become difficult to carry out blow molding due to occurrence of drawdown or the like in comparison with the case where the MFR falls within the range.

A styrene-based elastomer and/or a low-density polyethylene are preferably added to the thermoplastic resin. By adding the styrene-based elastomer or the low-density polyethylene to the thermoplastic resin, it is possible to improve the impact strength of the blow-molded foam at a low temperature.

Although not particularly limited, any elastomer may be used as the styrene-based elastomer, as long as it has a styrene unit with hydrogen added to its molecule. Examples thereof include hydrogenated elastomers such as a styrene-ethylene butylene-styrene block copolymer, a styrene-ethylene propylene-styrene block copolymer, and a styrene-butadiene random copolymer.

The compounding ratio of the styrene-based elastomer is preferably set within a range of less than 40 wt % with respect to the thermoplastic resin.

Moreover, the content of styrene in the styrene-based elastomer is preferably less than 30 wt %, more preferably less than 20 wt %, from the viewpoint of impact strength at a low temperature.

As the low-density polyethylene, from the viewpoint of impact strength at a low temperature, those having a density of not more than 0.91 g/cm$^3$ are preferably used. In particular, a linear ultra-low density polyethylene, polymerized by a metallocene-based catalyst, is preferably used.

The compounding ratio of the low-density polyethylene is preferably in a range less than 40 wt % with respect to the thermoplastic resin.

The thermoplastic resin is foamed by using a foaming agent before being subjected to blow molding.

Examples of the foaming agent include inorganic foaming agents such as air, carbon dioxide gas, nitrogen gas and water, or organic foaming agents such as butane, pentane, hexane, dichloromethane and dichloroethane.

Among these, air, carbon dioxide gas or nitrogen gas is preferably used as the foaming agent. In this case, it becomes possible to prevent tangible matters from being mingled therein, and consequently to suppress degradation of durability and the like.

Moreover, as the foaming method, a supercritical fluid is preferably used. That is, carbon dioxide gas or nitrogen gas is preferably brought into a supercritical state, and allowed to foam the resin mixture. In this case, it is possible to uniformly generate cells positively.

In addition to the styrene-based elastomer, low-density polyethylene and foaming agent, a core agent, a colorant and the like may be added to the thermoplastic resin.

In the climate control duct 1 (blow-molded foam) according to this embodiment, the wall portion has the closed cell structure in which the plurality of foamed cells are contained. When the expansion ratio of the wall portion is set within the predetermined range, it is possible to provide a lightweight structure. When the standard deviation of the cell diameter of the foamed cell in the thickness direction of the wall portion is set within the predetermined range, it is possible to provide homogeneous foamed cells in size. When the center-line average surface roughness Ra on the outer face of the wall portion is set within the predetermined range, it is possible to achieve high surface smoothness.

Moreover, the climate control duct 1 has a low frictional resistance against flowing air, and the ventilation efficiency can be improved. Thus, the pressure loss of climate control air is reduced, thereby making it possible to reduce generation of condensed moisture on the outside of the wall face of the duct.

The following description is given about a process for producing the blow-molded foam according to the present invention.

Figure 2:
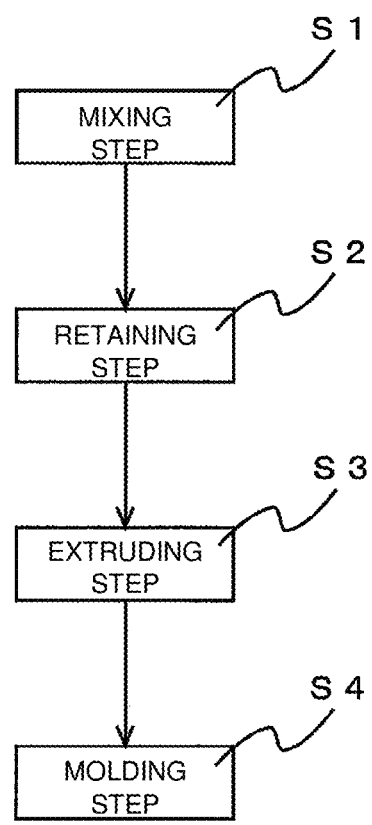
FIG. 2 is a flowchart that illustrates a process for producing a blow-molded foam according to the present invention.

FIG. 2 is a flowchart that illustrates the process for producing the blow-molded foam according to the present invention.

As illustrated in FIG. 2, the process for producing a blow-molded foam according to this embodiment includes a mixing step S1 of adding a thermoplastic resin to a foaming agent and mixing the thermoplastic resin with the foaming agent in an extruder to prepare a resin mixture, a retaining step S2 of retaining the resin mixture at a cylinder-shaped space defined between a mandrel and a die outer cylinder, an extruding step S3 of extruding a parison from a die slit by use of a ring-shaped piston, and a molding step S4 of subjecting the parison to blow molding by clamping split mold blocks with the parison inserted therebetween and blowing air on the parison.

In the process for producing a blow-molded foam according to this embodiment, since the parison is extruded at a predetermined extrusion rate by using the ring-shaped piston, the blow molding is carried out, with the size of the foamed cells being maintained.

With this arrangement, the process for producing the blow-molded foam makes it possible to obtain a blow-molded foam which has homogeneous foamed cells in size, is light in weight, and is excellent in surface smoothness.

The following description is given about the respective steps in detail.

(Mixing Step)

The mixing step S1 is a step of adding a thermoplastic resin to a foaming agent and mixing the thermoplastic resin with the foaming agent in the extruder to prepare a resin mixture. In this case, any one of conventionally known machines may be used on demand as the extruder.

Moreover, in the process for producing the blow-molded foam according to this embodiment, the polyolefin-based resin described above is used as the thermoplastic resin, and the foaming agent is used in its supercritical state. By using the foaming agent that is a supercritical fluid, the foamed cells are made finer.

Herein, the foaming agent is preferably prepared as a carbon dioxide gas or a nitrogen gas. These gases can be made into a supercritical state under comparatively moderate conditions.

More specifically, in the case where the carbon dioxide gas is used as the supercritical fluid, the following conditions are set: the critical temperature is 31° C. and the critical pressure is not less than 7.4 MPa. In the case where the nitrogen gas is used as the supercritical fluid, the following conditions are set: the critical temperature is 149.1° C. and the critical pressure is not less than 3.4 MPa.

Moreover, by allowing the polyolefin-based resin to foam by using the supercritical fluid, a resin mixture is obtained. At this time, as described above, a styrene-based elastomer and/or a low-density polyethylene may be added to the polyolefin.

(Retaining Step)

The retaining step S2 is a step of retaining the resin mixture at a cylinder-shaped space defined between a mandrel and a die outer cylinder. The retaining step is carried out using an extrusion head.

Figure 3:
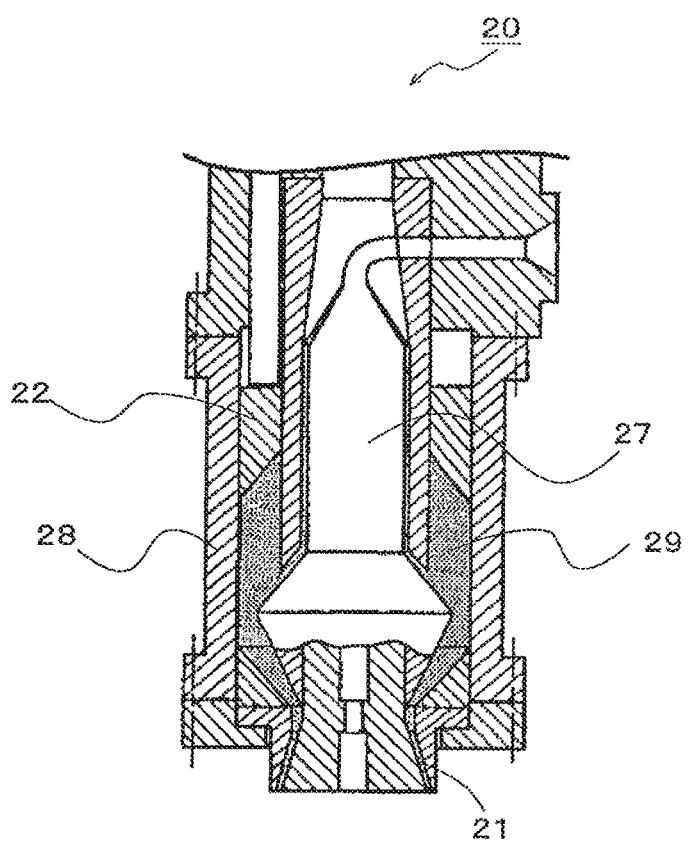
FIG. 3 is a partial section view that illustrates an extrusion head for use in the process for producing a blow-molded foam according to the present invention.

FIG. 3 is a partial section view that illustrates the extrusion head for use in the process for producing a blow-molded foam according to the present invention.

As illustrated in FIG. 3, the extrusion head 20 includes a die outer cylinder 28, a mandrel 27 that is placed substantially in the center of the die outer cylinder 28, a cylinder-shaped space 29 defined between the die outer cylinder 28 and the mandrel 27, a ring-shaped piston 22 for pressing the resin mixture retained at the cylinder-shaped space 29 downward, and a die slit 21 for discharging the resin.

In the retaining step S2, the resin mixture extruded by an extruder (not illustrated) moves along the periphery of the mandrel 27, is dropped in the cylinder-shaped space 29 between the mandrel 27 and the die outer cylinder 28, and is retained at the cylinder-shaped space 29.

Herein, the amount of resin to be retained is preferably 5 to 40 liters.

In the process for producing a blow-molded foam according to this embodiment, since a system in which the resin mixture is retained in the cylinder-shaped space 9 is prepared, the sizes of the foamed cells are made even during the period that the resin mixture is retained.

(Extruding Step)

The extruding step S3 is a step of extruding a parison from a die slit by use of a ring-shaped piston. That is, after a predetermined amount of the resin has been retained at the cylinder-shaped space 29, the parison (not illustrated) is discharged through the die slit 21 by pressing the ring-shaped piston 22 downward.

In the process for producing a blow-molded foam according to this embodiment, since a system in which the ring-shaped piston 22 extrudes the parison in the die (an accumulator-inside-die system or an accumulator head system) is adopted, it is possible to shorten the distance of the die slit 21, and also to increase the extrusion rate. Thus, it becomes possible to maintain the state of the foamed cells.

Figure 9:
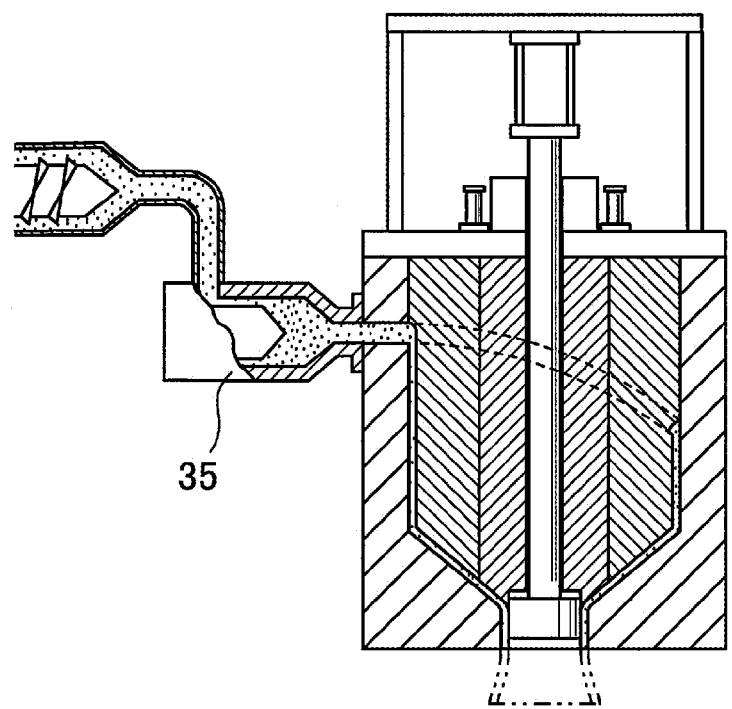
FIG. 9 is a partial section view that illustrates a conventional extrusion head.

On the other hand, a conventional extrusion head illustrated in FIG. 9 has a system in which the parison is extruded using an accumulator 35 placed outside the die (an accumulator-outside-die system) is adopted, the distance of the die slit is made longer, failing to increase the extrusion rate.

Herein, the extrusion rate of the parison is preferably not less than 700 kg/hr. In this case, it is possible to obtain a blow-molded foam having excellent surface smoothness. Moreover, the accumulator inside the die, which is used in the present invention, has an injection rate of not less than 200 $cm^3$/sec, preferably, not less than 500 $cm^3$/sec.

(Molding Step)

The molding step S4 is a step of subjecting the parison to blow molding by clamping split mold blocks with the parison inserted therebetween and blowing air on the parison.

Figure 4:
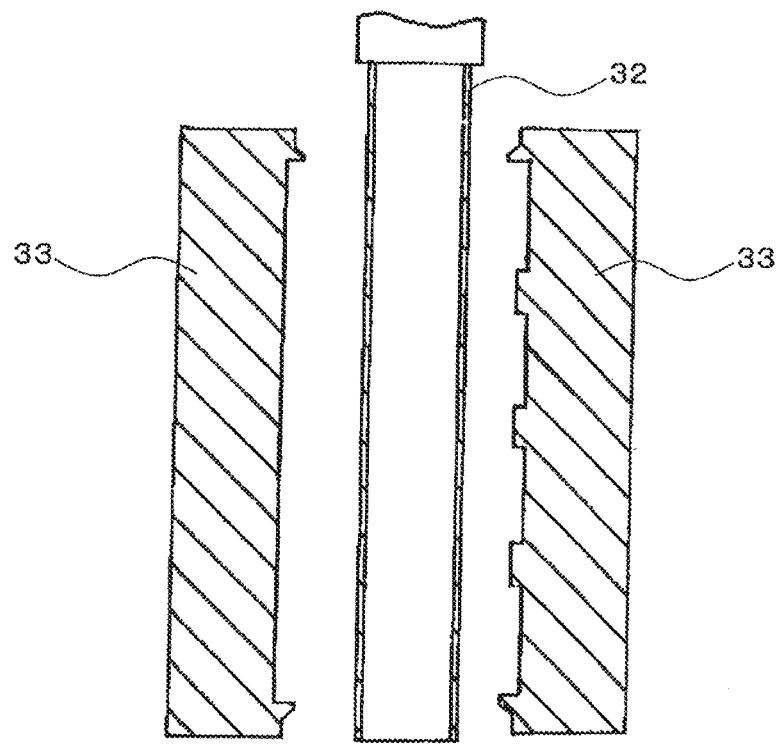
FIG. 4 is a section view that illustrates a method of blow molding in the process for producing a blow-molded foam according to the present invention.

FIG. 4 is a section view that illustrates a method of blow molding in the process for producing a blow-molded foam according to the present invention.

As illustrated in FIG. 4, the cylinder-shaped parison 32 is extruded between the split mold blocks 33 from the die slit (not illustrated). Then, the split mold blocks 33 are clamped with the parison 32 inserted therebetween.

Thereafter, air is blown on the parison 32, so that the parison 32 is subjected to blow molding.

Herein, the pressure used for blowing air is preferably 0.05 to 0.15 MPa, from the viewpoint of maintaining the shape of foamed cell.

Thus, a blow-molded foam is obtained.

In the process for producing a blow-molded foam according to this embodiment, by retaining a resin mixture at a predetermined position, the foamed cells can be homogenized in size, and by extruding the resin mixture at a predetermined extrusion rate by using a ring-shaped piston, blow molding is carried out with the size of the foamed cell appropriately maintained.

With this configuration, it becomes possible to obtain a blow-molded foam which has homogeneous foamed cells in size, which is light in weight and which is excellent in surface smoothness.

Second Embodiment

The following description is given about a structure in which the blow-molded foam according to the present invention is utilized as a skinned panel as a second embodiment of the present invention.

Figure 5:
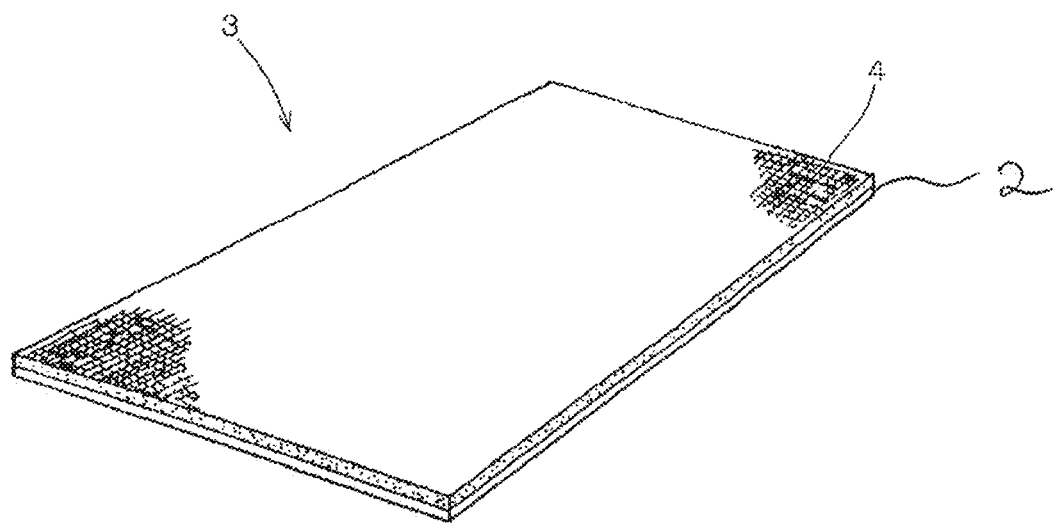
FIG. 5 is a perspective view that illustrates a blow-molded foam according to a second embodiment of the present invention.

FIG. 5 is a perspective view that illustrates a blow-molded foam according to a second embodiment of the present invention.

As illustrated in FIG. 5, a blow-molded foam (hereinafter, referred to also as "skinned panel") 3 according to this embodiment has a hollow structure with double walls, including wall portions that are formed in such a manner that a thermoplastic resin containing a foaming agent mixed therewith is subjected to blow molding. In this structure, a skin material 4 is bonded to one of surfaces of a base body 2 made of the wall portion. Such a skin material 4 is integrally bonded to the base body 2, simultaneously with the blow molding of the wall portion in the molding step.

Figure 6:
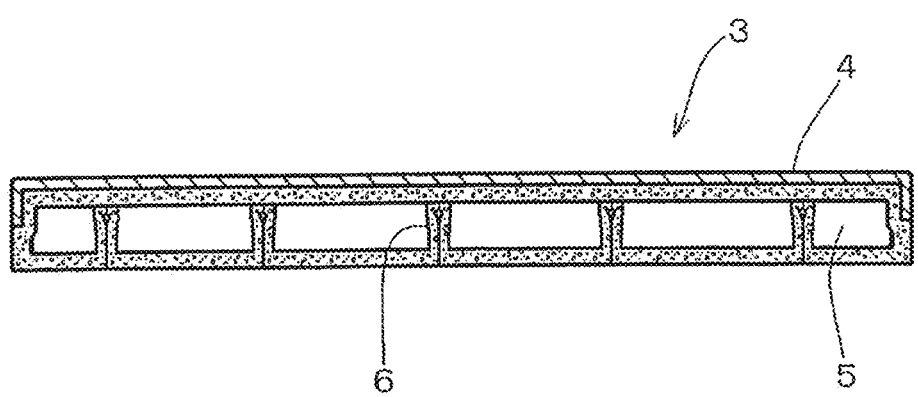
FIG. 6 is a section view that illustrates the blow-molded foam illustrated in FIG. 5.

FIG. 6 is a section view of the blow-molded foam illustrated in FIG. 5.

As illustrated in FIG. 6, in the skinned panel 3, the base body 2 made of the wall portion has a hollow structure with double walls, with a hollow portion 5 included therein, and a plurality of reinforcing ribs 6 are formed so as to divide the hollow portion 5. The reinforcing ribs 6 make it possible to improve the strength in a vertical direction.

Upon the clamping of the parison in the molding step, the reinforcing ribs 6 are formed by pressing the parison wall portion onto the parison side face in a manner so as to be folded down, by a slide core having a protruding shape in one direction.

Therefore, in the production of the skinned panel, in the molding step, the reinforcing ribs 6 are also formed simultaneously with the bonding of the skin material 4.

Herein, the wall portion is synonymous with the "wall portion" in the blow-molded foam according to the first embodiment, and since the structures and physical properties thereof are also the same, the description thereof will be omitted.

Moreover, the process for producing the blow-molded foam according to the second embodiment is the same as the process for producing the blow-molded foam according to the first embodiment, except for the foregoing difference in the molding step.

In the skinned panel 3 (blow-molded foam) according to this embodiment, the wall portion has a closed cell structure in which a plurality of foamed cells are formed. When the expansion ratio of the wall portion is set in a predetermined range, it is possible to provide a lightweight structure. When the standard deviation of the cell diameter of the foamed cell in the thickness direction of the wall portion is set in a predetermined range, it is possible to provide the homogeneous foamed cells in size. When the center-line average surface roughness Ra on the outer face of the wall portion is set in a predetermined range, it is possible to achieve high surface smoothness.

Moreover, it is possible to improve the deposition strength of the reinforcing ribs formed inside the wall face of the panel and the deposition strength of the skin bonded outside the wall face of the panel. Further, it is also possible to provide high rigidity and excellent outer appearance.

EXAMPLES

The following description is given about the present invention more specifically based upon examples and comparative examples; however, the present invention is not intended to be limited by the following examples.

Example 1

A propylene homopolymer (thermoplastic resin: trade name: PF814, made by SunAllomer) (70 wt %) having an MFR of 3.0 g/min at 230° C., with a long-chain branched structure introduced therein, and a crystalline ethylene-propylene block copolymer (NOVATECH PP EC9, made by Japan Polychem) (30 wt %) having an MFR of 0.5 g/min at 230° C. were mixed to form a mixture, and 96 parts by weight of this mixture, 3 parts by weight of talc MB (master batch) serving as a core agent and 1 part by weight of black MB (master batch) serving as a colorant were mixed. The density of the resin mixture was 0.91 g/$cm^3$.

To this was added carbon dioxide gas in a supercritical state as a foaming agent to be foamed so that a resin mixture was prepared. After having been mixed in an extruder, the resin mixture was retained at a cylinder-shaped space defined between a mandrel and a die outer cylinder by using an extrusion head illustrated in FIG. 3, and a cylinder-shaped parison was extruded between split mold blocks illustrated in FIG. 4 at a rate of 1500 kg/hr, by using a ring-shaped piston (accumulator inside die), and after clamping, air was blown on the parison subjected to clamping, at a pressure of 0.1 MPa, so that a sample A subjected to blow molding was obtained. Herein, the MFR was measured in conformity with JIS K-7210, with a test load of 2.16 kg being applied thereto.

Example 2

The same processes as those of Example 1 were carried out except that the extrusion rate was changed to 750 kg/hr so that a sample B was obtained.

Example 3

The same processes as those of Example 1 were carried out except that in place of the carbon dioxide gas, nitrogen gas was used so that a sample C was obtained.

Example 4

The same processes as those of Example 1 were carried out except that in place of the carbon dioxide gas, nitrogen gas was used, and that the extrusion rate was changed to 700 kg/hr so that a sample D was obtained.

Example 5

The same processes as those of Example 1 were carried out except that in place of the carbon dioxide gas, nitrogen gas was used, and that the extrusion rate was changed to 600 kg/hr so that a sample E was obtained.

Example 6

The same processes as those of Example 1 were carried out except that the extrusion rate was changed to 600 kg/hr so that a sample F was obtained.

Comparative Example 1

In place of the extrusion head illustrated in FIG. 3, a conventional extrusion head illustrated in FIG. 9 was used. That is, the resin mixture that had been mixed in an extruder was supplied to a cross head by using a plunger, from an accumulator cylinder (accumulator outside die) in the horizontal direction, installed outside the die head, and extruded as a cylinder-shaped parison through a die slit. Moreover, the extrusion rate was set to 450 kg/hr.

Except for the above-mentioned points, the same processes as those of Example 1 were carried out so that a sample G was obtained.

Comparative Example 2

The same processes as those of Comparative Example 1 were carried out except that in place of the carbon dioxide gas, nitrogen gas was used so that a sample H was obtained.

Comparative Example 3

The same processes as those of Comparative Example 1 were carried out except that the extrusion rate was changed to 300 kg/hr so that a sample I was obtained.

The physical properties of the samples A to I obtained in Examples 1 to 6 and Comparative Examples 1 to 3 were evaluated as described below. In each of the samples A to I, comparatively flat portions of three points, that is, two ends and the center portion in the longitudinal direction, were cut off by a microtome (RM2145, made by LEICA), and the cut-off cross section was photographed by a CCD camera (VH-630, made by Keyence).

1. Average Thickness (Mm)

In each of samples A to I, thicknesses were measured from the photographs with respect to the 3 points photographed by the CCD camera, and an average value of the respective values was calculated.

2. Expansion Ratio

The expansion ratio was calculated by dividing the density of each of resin mixtures used in the samples A to I by the apparent density of the corresponding wall faces of the samples A to I.

3. Average Cell Diameter (μm)

With respect to the 3 points photographed by the CCD camera in each of the samples A to I, the sizes of cell diameters in the thickness direction at 5 points taken with equal intervals from the outside to the inside in the thickness direction of the wall face were measured from the photograph, and an average value was calculated.

4. Center-Line Average Surface Roughness (Ra) (μm)

In conformity with JIS B0601, the center-line average surface roughness of each of the samples A to I was measured by using a surface-roughness measuring device (SURFCOM 470A, made by Tokyo Seimitsu Co., Ltd.). With respect to the measuring points of the surface roughness of a blow-molded foam, 5 points on the outside of the wall face and 5 points on the inside of the wall face of the blow-molded foam were measured, and an average value was obtained.

5. Standard Deviation of Cell Diameter (μm)

From the values of the cell diameters in the thickness direction of total 15 points measured upon calculating the average cell diameter, the standard deviation was calculated and found.

Table 1 shows the results obtained by these evaluations.

TABLE 1

| | Sample | Parison supply system | Average thickness (mm) | Expansion ratio | Average cell diameter (μm) | Center-line average surface roughness (μm) | Standard deviation of cell diameter (μm) |
|---|---|---|---|---|---|---|---|
| Example 1 | A | Accumulator inside die | 2.2 | 2.5 | 80 | 4.7 | 20 |
| Example 2 | B | Accumulator inside die | 2.0 | 2.1 | 85 | 5.2 | 31 |
| Example 3 | C | Accumulator inside die | 1.8 | 2.4 | 56 | 3.8 | 12 |
| Example 4 | D | Accumulator inside die | 2.1 | 2.7 | 96 | 6.1 | 28 |
| Example 5 | E | Accumulator inside die | 2.5 | 2.8 | 135 | 8.1 | 43 |
| Example 6 | F | Accumulator inside die | 2.4 | 2.7 | 140 | 8.8 | 47 |
| Comparative Example 1 | G | Accumulator outside die | 1.9 | 2.1 | 160 | 10.8 | 61 |
| Comparative Example 2 | H | Accumulator outside die | 2.0 | 2.5 | 151 | 10.2 | 55 |

TABLE 1-continued

|  | Sample | Parison supply system | Average thickness (mm) | Expansion ratio | Average cell diameter (μm) | Center-line average surface roughness (μm) | Standard deviation of cell diameter (μm) |
|---|---|---|---|---|---|---|---|
| Comparative Example 3 | I | Accumulator outside die | 2.3 | 2.3 | 177 | 12.0 | 71 |

In the samples A to F of Examples 1 to 6, by using the accumulator inside the die, which had a high injection rate, a parison could be extruded in a short period of time so that it was possible to obtain a blow-molded foam with a small standard deviation of the cell diameter of foamed cells (with less deviations in the distribution of cell diameters) and high surface smoothness.

Moreover, it was found that, by using nitrogen in a supercritical state as a foaming agent, the diameter of the foamed cells could be made smaller.

In contrast, in the samples G to I of Comparative Examples 1 to 3, deviations occurred in the distribution of the cell diameters of foamed cells. This is presumably caused by the fact that, in the case where the accumulator outside the die is used, since, upon extrusion of a thermoplastic resin in a fused state stored in the cylinder, the thermoplastic resin is extruded, with its flowing direction being changed by 90 degrees at the cross-head portion, and since the distance from the cylinder placed outside the die to the die slit from which the parison is extruded becomes comparatively longer, the pressure loss of the thermoplastic resin to be extruded becomes greater.

Next, the effects of the samples A to I obtained by Examples 1 to 6 and Comparative Examples 1 to 3 were evaluated as described below:

1. Photographs

In the samples A and G obtained in Example 1 and Comparative Example 1, comparatively flat portions in the center portion in the longitudinal direction were cut off by a microtome (RM2145, made by LEICA), and the cut-off cross section was photographed by a CCD camera (VH-630, made by Keyence).

Figure 7:
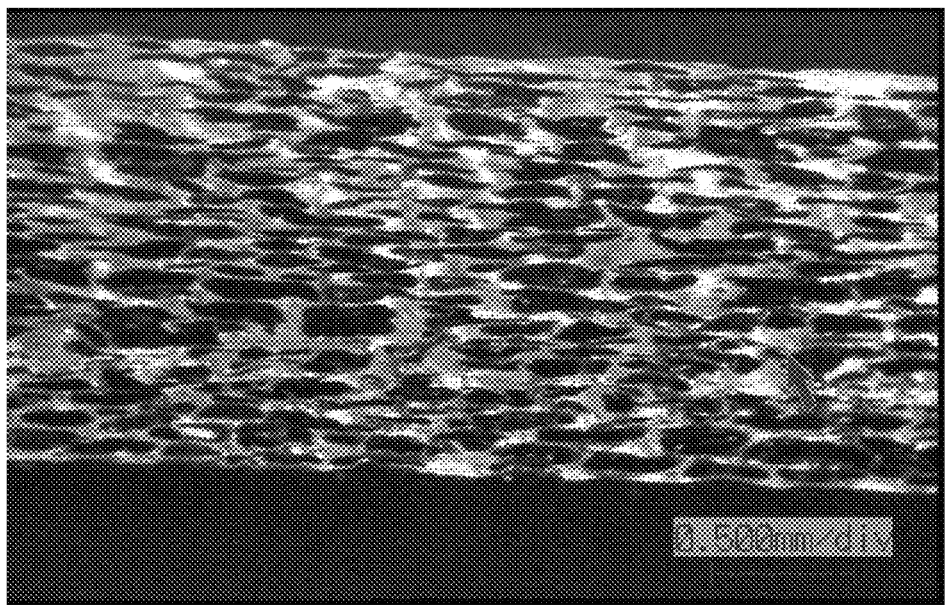
FIG. 7 is an enlarged photograph, which is taken by a CCD camera, of a cross section of a wall face of a sample in Example 1.
Figure 8:
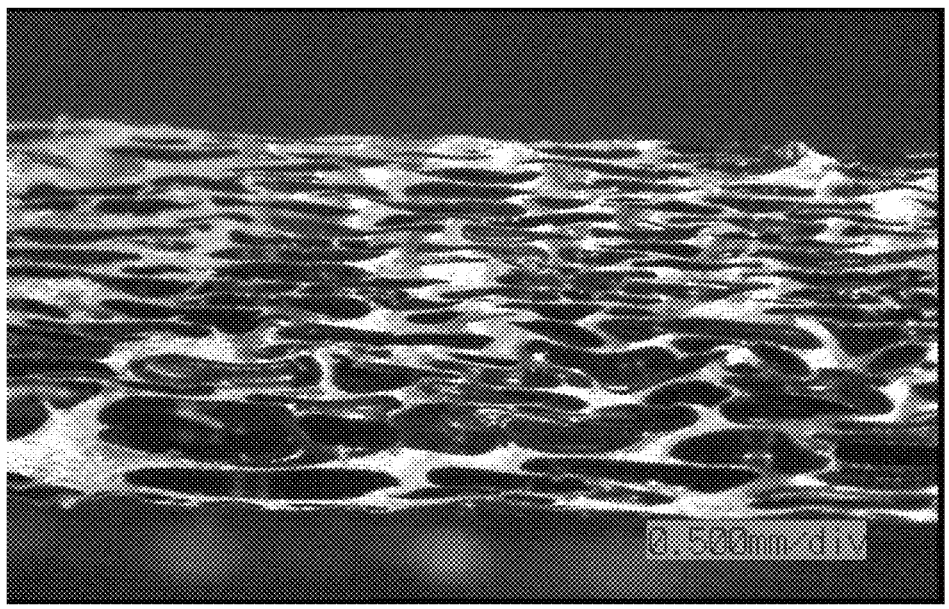
FIG. 8 is an enlarged photograph, which is taken by a CCD camera, of a cross section of a wall face of a sample in Comparative Example 1.

FIG. 7 illustrates a photograph of the sample A of Example 1, thus obtained, and FIG. 8 illustrates a photograph of the sample G of Comparative Example 1, thus obtained.

2. Peel Strength (gf)

To a test piece cut off from each of the samples A to I was adhered a non-woven fabric (hereinafter, referred to as "packing") (thickness: 3 mm, width: 10 mm) to which double-sided tapes had been bonded, and one of the end faces of the packing was adhered and secured to the test piece, with the other end face being attached to a tensile testing machine.

Moreover, the other end face of the packing was pulled by the tensile testing machine in a manner so as to be folded over to the other end face side, and the peel strength at this time was measured. Herein, as the packing, a non-woven fabric/acryl-based adhesive material (interior member securing double-sided tape #5782, made by Sekisui Chemical Co., Ltd.) having an adhesive strength of 18.6 N/25 mm measured in conformity with JIS Z0237 (180° peeling method) was used, and the tension rate was set to 300 mm/min.

Table 2 shows the results of the tests.

3. Outer Appearance

The outer appearance of each of the samples A to I was visually evaluated in accordance with the following criteria.

Excellent: The surface was smooth, with a uniform outer appearance.

Moderate: Although the surface was comparatively smooth, the outer appearance was inferior in uniformity.

Bad: Surface irregularities were clearly observed visually, and the outer appearance was inferior.

Table 2 shows the results of the tests.

TABLE 2

|  |  | Peel Strength (gf) | Appearance |
|---|---|---|---|
| Example 1 | Sample A | 260 | Excellent |
| Example 2 | Sample B | 250 | Excellent |
| Example 3 | Sample C | 270 | Excellent |
| Example 4 | Sample D | 230 | Moderate |
| Example 5 | Sample E | 210 | Moderate |
| Example 6 | Sample F | 200 | Moderate |
| Comparative Example 1 | Sample G | 170 | Bad |
| Comparative Example 2 | Sample H | 180 | Bad |
| Comparative Example 3 | Sample I | 155 | Bad |

In the samples A to F of Examples 1 to 6 of the present invention, the peel strength was excellent in comparison with those of the samples G to I of Comparative Examples 1 to 3. Thus, the blow-molded foam of the present invention was confirmed to be excellent in smoothness.

In view of these facts, it was confirmed that the present invention could provide a blow-molded foam which has homogeneous foamed cells in size, is light in weight and is excellent in surface smoothness.

INDUSTRIAL APPLICABILITY

In addition to a climate control duct for vehicles and a skinned panel, the blow-molded foam of the present invention is applicable to an interior material for vehicles, and the like. The blow-molded foam makes it possible to devote to weight reduction of a vehicle without causing degradation of various physical properties as plastic parts.

The invention claimed is:

1. A blow-molded foam formed in such a manner that a thermoplastic resin containing a foaming agent mixed therewith is subjected to blow molding, wherein
   a wall defining the blow-molded foam is in a foamed state having a closed cell structure including a plurality of foamed cells,
   the foamed cells have flat shapes in a direction orthogonal to a thickness direction of the wall,
   the foamed cells have an average cell diameter of less than 300 μm in the thickness direction of the wall,
   the foamed cells have cell diameters having a standard deviation of less than 40 μm in the thickness direction of the wall.

2. The blow-molded foam according to claim 1, wherein the wall has an average thickness of not more than 3.5 mm and an expansion ratio of not less than 2.0 times.

3. The blow-molded foam according to claim 1, wherein the foamed cells have the average cell diameter of greater than 100 μm in the thickness direction of the wall.

4. The blow-molded foam according to claim 3, wherein cell diameters of the foamed cells in the thickness direction of the wall are at least three times smaller than corresponding dimensions of the foamed cells in the direction orthogonal to the thickness direction of the wall.

5. The blow-molded foam according to claim 1, wherein cell diameters of the foamed cells in the thickness direction of the wall are at least three times smaller than corresponding dimensions of the foamed cells in the direction orthogonal to the thickness direction of the wall.

6. The blow-molded foam according to claim 1, wherein the thermoplastic resin is a polyolefin-based resin.

7. The blow-molded foam according to claim 6, wherein the polyolefin-based resin includes a propylene homopolymer having a long-chain branched structure.

8. The blow-molded foam according to claim 1, which is a climate control duct for a vehicle.

9. A blow-molded foam comprising a wall portion formed in such a manner that a thermoplastic resin containing a foaming agent mixed therewith is subjected to blow molding, wherein
the wall portion has a closed cell structure in which a plurality of foamed cells are contained,
the wall portion has an expansion ratio of not less than 2.0 times,
the foamed cell has a cell diameter having a standard deviation of less than 40 μm in a thickness direction of the wall portion.

10. The blow-molded foam according to claim 9 wherein the thermoplastic resin is a polyolefin-based resin.

11. The blow-molded foam according to claim 10, wherein an average cell diameter of the foamed cell in the thickness direction of the wall portion is less than 300 μm.

12. The blow-molded foam according to claim 10, wherein an average cell diameter of the foamed cell in the thickness direction of the wall portion is less than 100 μm, and the standard deviation of the cell diameter of the foamed cell in the thickness direction of the wall portion is less than 30 μm.

13. The blow-molded foam according to claim 10, wherein the polyolefin-based resin is a propylene homopolymer having a long-chain branched structure.

14. The blow-molded foam according to claim 13, wherein an average cell diameter of the foamed cell in the thickness direction of the wall portion is less than 300 μm.

15. The blow-molded foam according to claim 13, wherein an average cell diameter of the foamed cell in the thickness direction of the wall portion is less than 100 μm, and the standard deviation of the cell diameter of the foamed cell in the thickness direction of the wall portion is less than 30 μm.

16. The blow-molded foam according to claim 9, wherein an average cell diameter of the foamed cell in the thickness direction of the wall portion is less than 300 μm.

17. The blow-molded foam according to claim 9, wherein an average cell diameter of the foamed cell in the thickness direction of the wall portion is less than 100 μm, and the standard deviation of the cell diameter of the foamed cell in the thickness direction of the wall portion is less than 30 μm.

18. The blow-molded foam according to claim 9, wherein the closed cell structure has a closed cell ratio of not less than 70%.

19. The blow-molded foam according to claim 9, wherein the wall portion has an average thickness of not more than 3.5 mm.

* * * * *